(12) United States Patent
Barfield, Jr. et al.

(10) Patent No.: US 9,639,978 B2
(45) Date of Patent: May 2, 2017

(54) METHOD AND SYSTEM FOR AVATAR REPLAY BASED ON MOBILE SENSOR INFORMATION

(71) Applicant: HTI IP, LLC, Atlanta, GA (US)

(72) Inventors: James Barfield, Jr., Atlanta, GA (US); Robert Siegel, Marietta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 147 days.

(21) Appl. No.: 14/096,201

(22) Filed: Dec. 4, 2013

(65) Prior Publication Data
US 2015/0155007 A1 Jun. 4, 2015

(51) Int. Cl.
*G06T 17/05* (2011.01)
*G06T 15/20* (2011.01)

(52) U.S. Cl.
CPC ............ *G06T 17/05* (2013.01); *G06T 15/20* (2013.01); *G06T 2215/16* (2013.01)

(58) Field of Classification Search
CPC .......... H04N 1/00204; H04N 21/4325; H04N 21/2387; G11B 27/026
USPC ....................................................... 386/278
See application file for complete search history.

(56) References Cited

U.S. PATENT DOCUMENTS

| | | | | |
|---|---|---|---|---|
| 8,793,033 B2* | 7/2014 | Schuerman | ............ | G01C 21/26 342/357.2 |
| 2006/0040239 A1* | 2/2006 | Cummins | ............ | G09B 19/167 434/62 |
| 2007/0257815 A1* | 11/2007 | Gunderson | ............ | G08G 1/16 340/903 |
| 2008/0084283 A1* | 4/2008 | Kalik | .................. | B60Q 9/00 340/435 |
| 2008/0111666 A1* | 5/2008 | Plante | .................. | G07C 5/008 340/425.5 |
| 2009/0177350 A1* | 7/2009 | Williams | ............ | G01M 15/04 701/31.4 |
| 2009/0177383 A1* | 7/2009 | Tertoolen | ........... | G01C 21/3682 701/532 |
| 2010/0149331 A1* | 6/2010 | DiMare | ................ | G11B 27/034 348/143 |
| 2012/0065873 A1* | 3/2012 | Van de Velde | ...... | G08G 1/0104 701/119 |
| 2012/0251079 A1* | 10/2012 | Meschter | ............ | G06F 19/3406 386/278 |
| 2012/0308964 A1* | 12/2012 | Voorhees | ............. | G09B 19/167 434/29 |
| 2013/0144521 A1* | 6/2013 | Mathieu | ............... | G01C 21/365 701/410 |
| 2013/0297198 A1* | 11/2013 | Vande Velde | .......... | G01C 21/28 701/409 |
| 2014/0002277 A1* | 1/2014 | Fulger | ................ | G01C 21/3415 340/905 |

(Continued)

*Primary Examiner* — Jay Patel
*Assistant Examiner* — Marnie Matt

(57) ABSTRACT

A system and method for generating and displaying a video animation or replay of a user's drive or run using data from sensors, mapping data, manufacturer data, environmental data, and/or user data. The video replay shows an avatar representing the user or the user's vehicle and may also show the surrounding environment through which the user traveled. The video replay may be used for entertainment, instruction, insurance, or law enforcement purposes, for example.

20 Claims, 7 Drawing Sheets

(56) References Cited

U.S. PATENT DOCUMENTS

2015/0134226 A1\* 5/2015 Palmer .................. B60W 40/10
                                                                                  701/101

\* cited by examiner

Sensor Data 601

| Timestamp | Location | Heading | Parameters |
|---|---|---|---|
| 1 | A | W | ? |
| 2 | B | W | ? |
| 3 | C | X | ? |
| 4 | D | Y | ? |
| 5 | E | Z | ? |
| 6 | F | Y | ? |

Map Data 603

| Location | Heading | Image |
|---|---|---|
| A | W | JPG_1 |
| A | X | JPG_2 |
| A | Y | JPG_3 |
| B | W | JPG_4 |
| F | W | JPG_5 |
| F | Y | JPG_6 |

Environmental Data 602

| Timestamp | Location | Parameters |
|---|---|---|
| 1 | A | 75F; rain y; snow n; 8000K |
| 2 | B | ? |
| 3 | C | ? |
| 4 | D | ? |
| 5 | E | ? |
| 6 | F | ? |

Model Data 604

| Model | Angle | Image |
|---|---|---|
| POR_911 | 0 | JPG_A |
| POR_911 | 45 | JPG_B |
| POR_911 | 90 | JPG_C |
| POR_911 | 135 | JPG_D |
| POR_911 | 180 | JPG_E |
| POR_BOX | 0 | JPG_L |

FIG. 6

METHOD AND SYSTEM FOR AVATAR REPLAY BASED ON MOBILE SENSOR INFORMATION

FIELD OF THE INVENTION

The field of the present invention relates generally to generating a virtual replay of a vehicle's or person's movement using data from mobile sensors.

BACKGROUND

Drivers and sports aficionados often desire to review video or image highlights of a recent drive or "run" for entertainment, coaching, or educational purposes. Many sources of data can be used to generate such video or images, including sensor data, mapping data, environmental data, user data, and data from manufacturers of vehicles, for example.

BRIEF DESCRIPTION OF THE DRAWINGS

In order to facilitate a fuller understanding of the exemplary embodiments, reference is now made to the appended drawings, in which like reference characters are used to indicate like elements. These drawings should not be construed as limiting, but are intended to be exemplary only.

FIG. 6 depicts exemplary tables of data organized according to a predefined schema, and which may be used by the generation module to correlate the various data, according to an exemplary embodiment of the invention;

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

The description below describes modules that may include one or more servers, databases, subsystems and other components. As used herein, the term "module" may be understood to refer to non-transitory executable software, firmware, processor, hardware, and/or various combinations thereof. Modules, however, are not to be interpreted as software that is not implemented on hardware, firmware, or recorded on a tangible processor-readable or recordable storage medium (i.e., modules are not software per se). The modules are exemplary. The modules may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Embodiments of the system provide the ability to gather data from a user, an apparatus associated with the user, and/or third parties, for the exemplary purpose of generating a video reproduction of movement of the user and/or the user's apparatus. One exemplary embodiment relates to a driver of a vehicle and gathering data from an on-board diagnostic port device ("OBD") on the vehicle, from the user him/herself, and/or from various third parties to generate an animated video reproduction of a drive performed by the driver in the vehicle. Such video reproduction may be presented to the driver or other interested parties for entertainment, educational, coaching, or insurance purposes, for example. Another exemplary embodiment relates to a person using a sporting apparatus and gathering data from sensors on the person or apparatus, from the user him/herself, and from various third parties to generate an animated video reproduction for purposes similar to those listed above.

Figure 1:
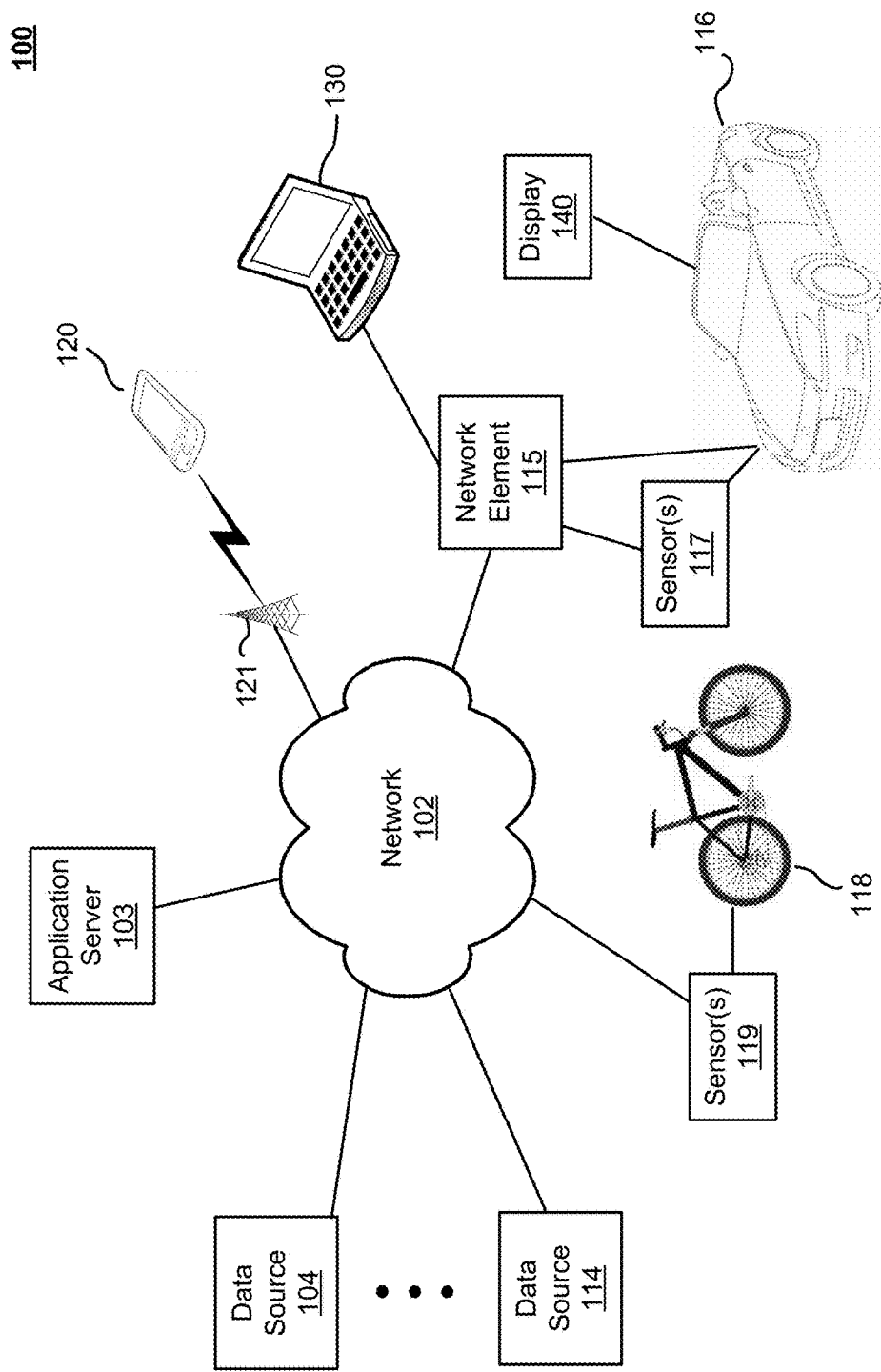
FIG. 1 depicts a block diagram of a system architecture for sending data through a network, according to an exemplary embodiment.

Referring to FIG. 1, a schematic diagram of a system 100 for gathering data from various sources or devices is shown, according to an exemplary embodiment. As illustrated, network 102 may be communicatively coupled with one or more video displaying devices, one or more data transmitting devices or entities, network element 115, or wireless transceiver 121. Exemplary video displaying devices may include a mobile device 120, vehicle display 140, or network client 130, for example. These and other types of video displaying devices may be communicatively coupled directly with network 102 or via one or more intermediary devices, such as transceiver 121 or network element 115.

It should be appreciated that the system 100 of FIG. 1 may be implemented in a variety of ways. Architecture within system 100 may be implemented as a hardware component (e.g., as a module) within a network element or network box. It should also be appreciated that architecture within system 100 may be implemented in computer executable software (e.g., on a tangible computer-readable medium). Module functionality of architecture within system 100 and even the hardware module 200 of FIG. 2 may be located on a single device or distributed across a plurality of devices including one or more centralized servers and one or more mobile units or end user devices.

As used herein, "video" or "video animation" may be considered to be comprised of a series or sequence of still image frames such that when the image frames are displayed on a video display device, they depict scenes in motion. "User" may be used interchangeably with "viewer." "Display device" may be considered a mobile device 120, a network client 130, or a vehicle display 140, for example. The display device may comprise various components for displaying the video, as is well known in the art. For example, depending on the type of device, the video may be displayed on one or more of a plasma display panel (PDP), liquid crystal display (LCD), thin film transistor (TFTLCD), super LCD, light emitting diode (LED), organic LED (OLED), active matrix OLED (AMOLED), LED-backlit LCD, super AMOLED, or a retina display.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cellular network, corporate networks, or home networks.

Network client 130 may be a desktop computer, a laptop computer, a tablet, a server, a personal digital assistant, or other computer capable of sending or receiving network signals. Network client 130 may use a wired or wireless connection. It should also be appreciated that the network client 130 may be a portable electronic device capable of being transported. Such a device may transmit or receive signals and store information in transit, and in the event it is transported, the portable electronic device may still operate using the data (e.g., digital video) it stored.

Transceiver 121 may be a repeater, a microwave antenna, a cellular tower, or another network access device capable of providing connectivity between different network mediums. Transceiver 121 may be capable of sending or receiving signals via a mobile network, a paging network, a cellular network, a satellite network or a radio network. Transceiver 121 may provide connectivity to one or more wired networks and may be capable of receiving signals on one medium such as a wired network and transmitting the received signals on a second medium, such as a wireless network.

Mobile device 120 may be a mobile communications device, a smartphone, a tablet computer, a wearable computer such as in the form of a wrist watch or glasses, a home phone, a cellular phone, a mobile phone, a satellite phone, a personal digital assistant, a computer, a handheld multimedia device, a personal media player, a gaming device, a mobile television, or other devices capable of displaying video and communicating directly with network 102 or via transceiver 121. Mobile device 120, network client 130, and vehicle display 140 may connect to network 102 and communicate with other network elements, servers or providers using WiFi, 3G, 4G, Bluetooth, or other chipsets.

Network element 115 may include one or more processors (not shown) for recording, transmitting, receiving, or storing data. Network element 115 may transmit and receive data to and from network 102. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection. A number of different types of signals may be transmitted via network 102 including, but not limited to, signals indicative of information content, such as a video signal.

Figure 3:
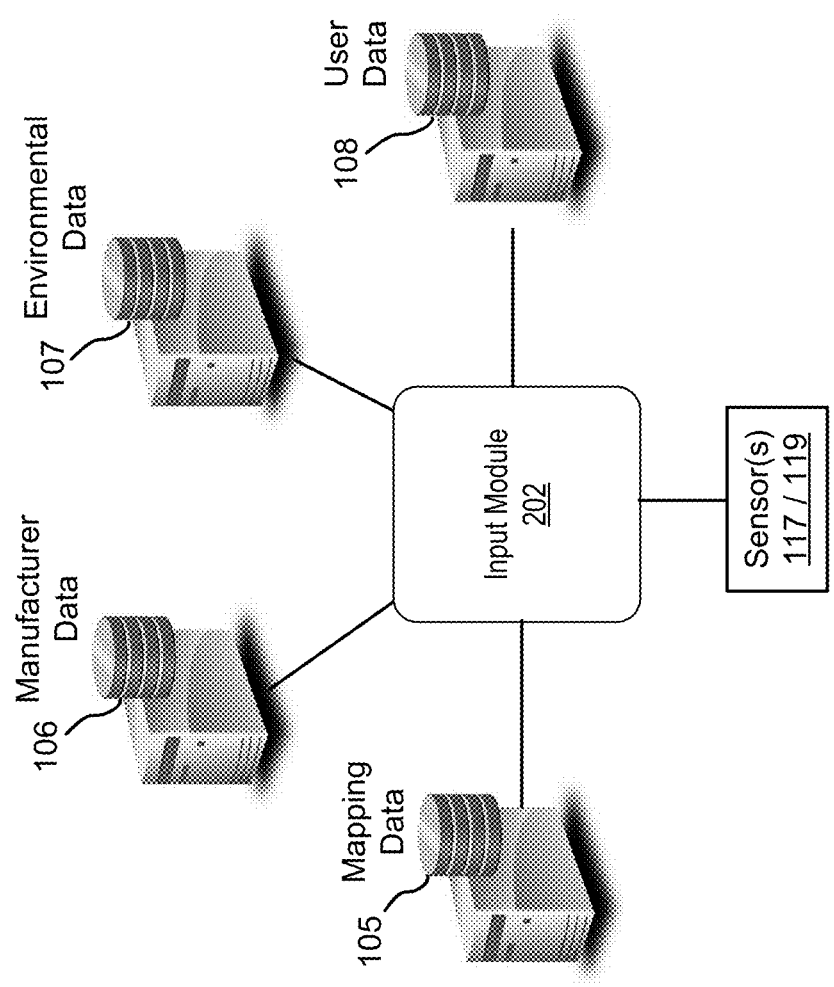
FIG. 3 depicts exemplary sources of data for generating a video reproduction, according to an exemplary embodiment of the invention.

Data sources 104 . . . 114 represent various entities or databases that provide relevant data, such as street view data, 2D or 3D maps data, other mapping data, 2D or 3D building models, road, and terrain data, manufacturer data, environmental data, user data, stored processing device data, elevation data, location data, weather data, structural data, or other forms of data. For simplicity, as shown in FIG. 3, the various sources of data may be considered to fall under mapping data 105, manufacturer data 106, environmental data 107, user data 108, and data from sensors 117 (or 119).

Mapping data 105 may include street view data, 2D or 3D maps data, 2D or 3D building models, road, and terrain data, elevation data, traffic data, location data, or GPS data, for example. Sources of this data may include Google Maps®, OpenStreetMap, OpenCycleMap, NavTeq®, Garmin®, Microsoft®, or Yahoo®, for example.

Manufacturer data 106 may include structural data or model data from architects or manufacturers, such as computer models of vehicles or buildings. This data may come directly from vehicle manufacturers, architects, or model aggregators such as TurboSquid®, for example.

Environmental data 107 may include weather data or barometric pressure data, for example. Sources of environmental data 107 may include The National Climatic Data Center or OpenWeatherMap, for example.

User data 108 may include data provided by or about a user, user preferences, or other information about a user's vehicle or sporting apparatus. In some exemplary embodiments, the user may be a driver of a vehicle, a person using a sporting apparatus, a person performing the method or system disclosed herein, or a person viewing the avatar replay. There may be more than one user, just as there may be multiple sensors providing sensor data (e.g., multiple vehicle OBD devices). For example, user data 108 or data from sensors 117 may come from multiple users or multiple users' vehicles or sporting apparatus. In the case of multiple user vehicles, the system may gather data from multiple OBD devices on multiple vehicles, and use such data to generate an avatar replay with multiple avatars, i.e., vehicles. Sources of user data 108 may include the user personally or a device associated with the user.

Sensors 117 may include one or more sensors attached to a user's vehicle or sporting apparatus. In a first exemplary embodiment, an on-board diagnostic ("OBD") port device on the vehicle may provide substantially all of the data relating to the vehicle and its location, motion, or acceleration. The OBD device may collect large amounts of data regarding the vehicle to which it is attached, including: location (GPS, GLONASS), speed, stops, starts, time stopped, sudden stops/starts, temperature, wipers on/off, lights on/off, time with brakes and/or throttle off, wheel slippage, acceleration values, barometric pressure values, nearby Wi-Fi signals, gyroscope sensor information, height information from an altimeter, visual information from a camera communicatively coupled to the OBD device, audio from a microphone, or revolutions per minute (RPM) of the vehicle's engine, for example. Data may be gathered from multiple OBD devices on multiple vehicles, and it should be appreciated that "OBD device" may refer to "one or more OBD devices." The OBD device may include a number of sensors including an accelerometer, barometer, altimeter, and gyroscope, for example.

Figure 2:
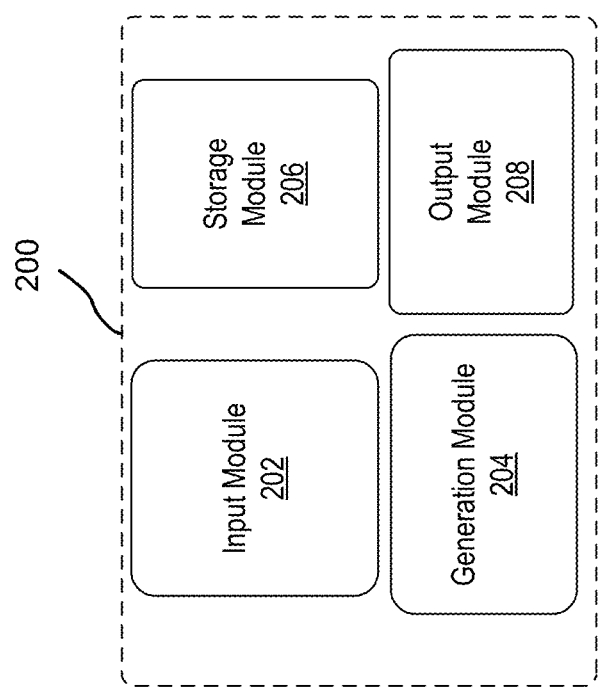
FIG. 2 depicts a block diagram of a hardware module for gathering data, generating a video reproduction, and outputting such video to a user or other parties, according to an exemplary embodiment of the invention.

FIG. 2 shows a block diagram of a hardware module at a computing device 200, such as a mobile device 120, for gathering data, generating a video reproduction, and outputting such video to a user or other parties, according to an exemplary embodiment of the invention. Data may be gathered by or received at input module 202 and stored in storage module 206. Generation module 204 may process the data to generate a video animation or replay of the user's drive or run, as explained below. Output module 208 may output the generated video to a display device for viewing by the user or other parties. Output module 208 may be configured to read data from storage module 206 or receive data directly from generation module 204, to thereby output video to a display device. Output module 208 may also be configured to output text or reports to a viewer, which text/reports may identify various classified "events" from the drive. Classification of "events" is explained in further detail below. Output module 206 may communicate directly or via a network with the other modules of FIG. 2 or with other system architecture components shown in FIG. 1. Like other modules, the generation module 204 may have executable instructions stored in a program memory, either within the module itself or in storage module 206. One or more processors coupled to or within the modules are configured to carry out the executable instructions to allow the module to carry out its functions. Using executable instructions and a processor, generation module 204 is able to generate a video animation or replay of the user's drive or run by gathering, for example, mapping data 105, manufacturer data 106, environmental data 107, user data 108, and data from sensor(s) 117/119 (hereinafter sensors 117). Data from these various sources may be in the form of models and/or images, or may be used to generate models and/or images. These models and/or images may be superimposed on each other and moved relative to each other to create the video animation or replay. The video may be displayed on a display device as a video, animation, slide show, a single image, and/or a collection of images, for example, and may include text or symbols superimposed on the video for the exemplary purpose of entertaining or instructing the viewer.

Figure 4:
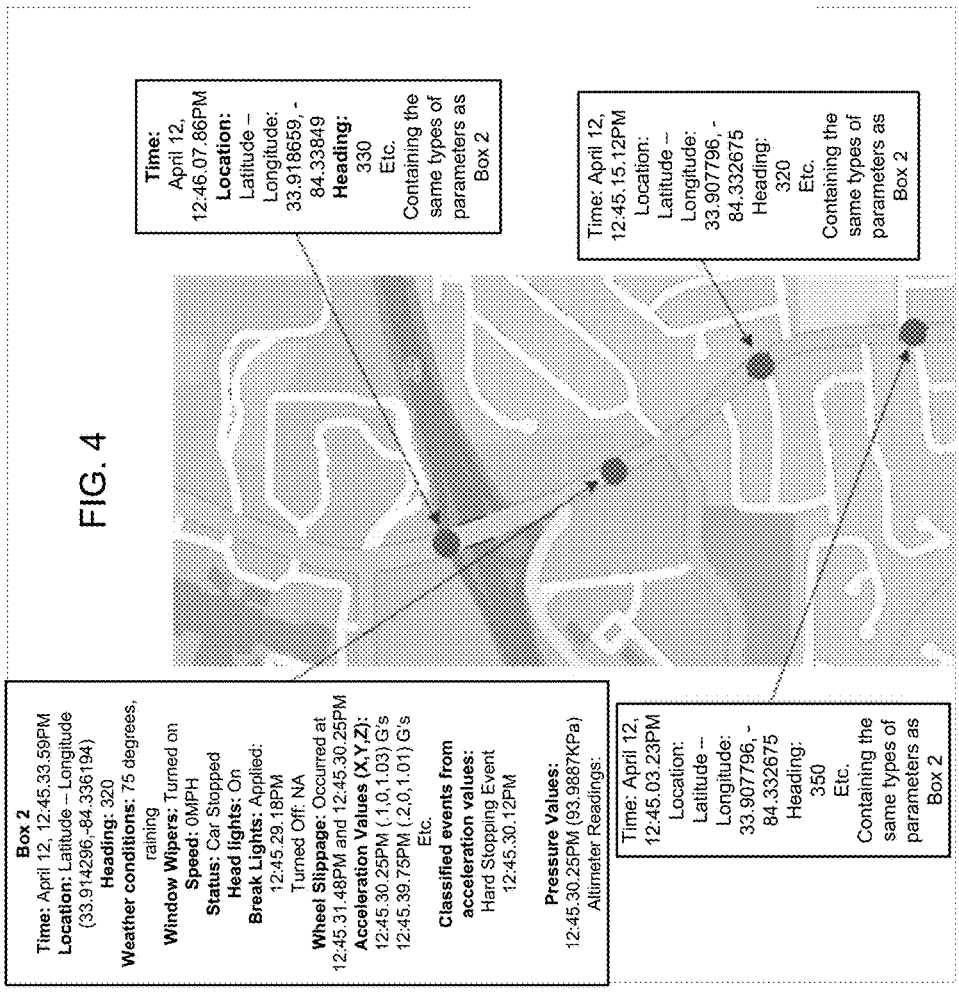
FIG. 4 depicts exemplary sensor data and mapping data that may be gathered during a drive, according to an exemplary embodiment of the invention.

FIG. 3 shows exemplary data that may be captured by the OBD over a period of time, including location (e.g., latitude and longitude), heading (degrees), weather conditions (degrees, precipitation), whether the window wipers are on/off, vehicle speed, vehicle status, whether the headlights are on/off, application of brakes, wheel slippage, skidding, sliding, rate of acceleration (measured in g's in the x, y, z directions, for example), pressure values (kPa), altitude, grade (rate of incline/decline), fuel consumption, etc. Data may also be interpreted by the input module 202 and/or the generation module 204 to classify events, including vehicular events such as a hard or soft stop, as depicted in FIG. 4. Additional data may be calculated using data collected by the OBD device, such as rate of ascent or descent using the barometric data, force of turns, pivots, or other g-forces, for example. All or a subset of this data may be used by the generation module 204 to depict an avatar on a video screen and alter or manipulate the shape and/or position of the avatar and surrounding structures, roads, or environment, to represent the actual speed, movement, motion, acceleration, forces, or momentum of the avatar and its associated equipment (which in this exemplary embodiment is a driver and a vehicle).

Location data may be collected every 1-2 seconds by a GPS module within the OBD device. Acceleration data may be collected by an accelerometer at 50 Hz and pressure data may be collected by a barometer at 10 Hz, for example. All of the collected data may have a timestamp associated with it to indicate when the data was collected, and this timestamp may be tagged to the data itself, and eventually stored with the data in the storage module 206. Data may be collected continuously over a period of time until the vehicle is turned off or until the user directly or indirectly deactivates the OBD device.

Data from the OBD device or other sensors may be input by the sensor (or retrieved by a processor in the input module 202) into input module 202 along with other data, such as mapping data 105, manufacturer data 106, environmental data 107, and/or user data 108, as reflected in FIG. 3. Then generation module 204 may match location "stamps" with the timestamps within the numerous data for the purpose of recreating an animated version of the drive. For example, the exemplary vehicle in FIGS. 4-5 had (latitude, longitude) coordinates of (33.914296, −84.336194) at 12:45.33.59 PM on April 12, with a heading of 320 deg, as recorded by the OBD device on the vehicle. The input module 202 may gather mapping data 105 pertaining to this particular location, which may include the precise street the vehicle was traveling on, local traffic conditions, and information about any surrounding buildings, and the nature of this mapping data may depend on the source of the mapping data. For example, using the location coordinates and heading data as determined by the OBD device, various mapping data may be gathered to allow generation module 204 to create an animated video, including street view data, 2D maps, 3D maps, terrain data, satellite pictures, and/or pictures or structural models of buildings to the north, south, east, and west of the vehicle at particular locations. Generation module 204 may use this mapping data 105 and appropriately orient the street, 2D/3D maps, satellite pictures, and/or models and pictures of buildings, for example, based on the heading data received from the OBD device.

Input module 202 may also gather environmental data 107 for the time of 12:45.33.59 PM on April 12. Some types of environmental data 107, such as weather data, may be gathered less frequently than sensor data because the weather does not change as frequently as sensor data from the OBD device. Accordingly, weather data may be gathered every several minutes, such as every 10-15 minutes, so as to minimize the amount of data that the generation module 204 needs to process and correlate in order to generate an animated video replay of the drive. After input module 202 receives (or retrieves) the environmental data 107, the environmental data 107 may be stored in storage module 206. Generation module 204 may retrieve the environmental data 107 from storage module 206 or directly from input module 202 and use this environmental data 107 to generate a reproduction of the actual environment that occurred at that point in time, such as clear blue skies or rain, for example.

Input module 202 may further gather manufacturer data 106 for the vehicle, such as vehicular models for the driver's particular vehicle. Gathering manufacturer data 106 may occur before, during, or after the drive, and such data may be stored in storage module 206. Generation module 204 may retrieve the manufacturer data 106 from storage module 206 or directly from input module 202 and generation module 204 may use this manufacturer data 106 to generate a depiction of the driver's vehicle in the video animation.

Figure 5:
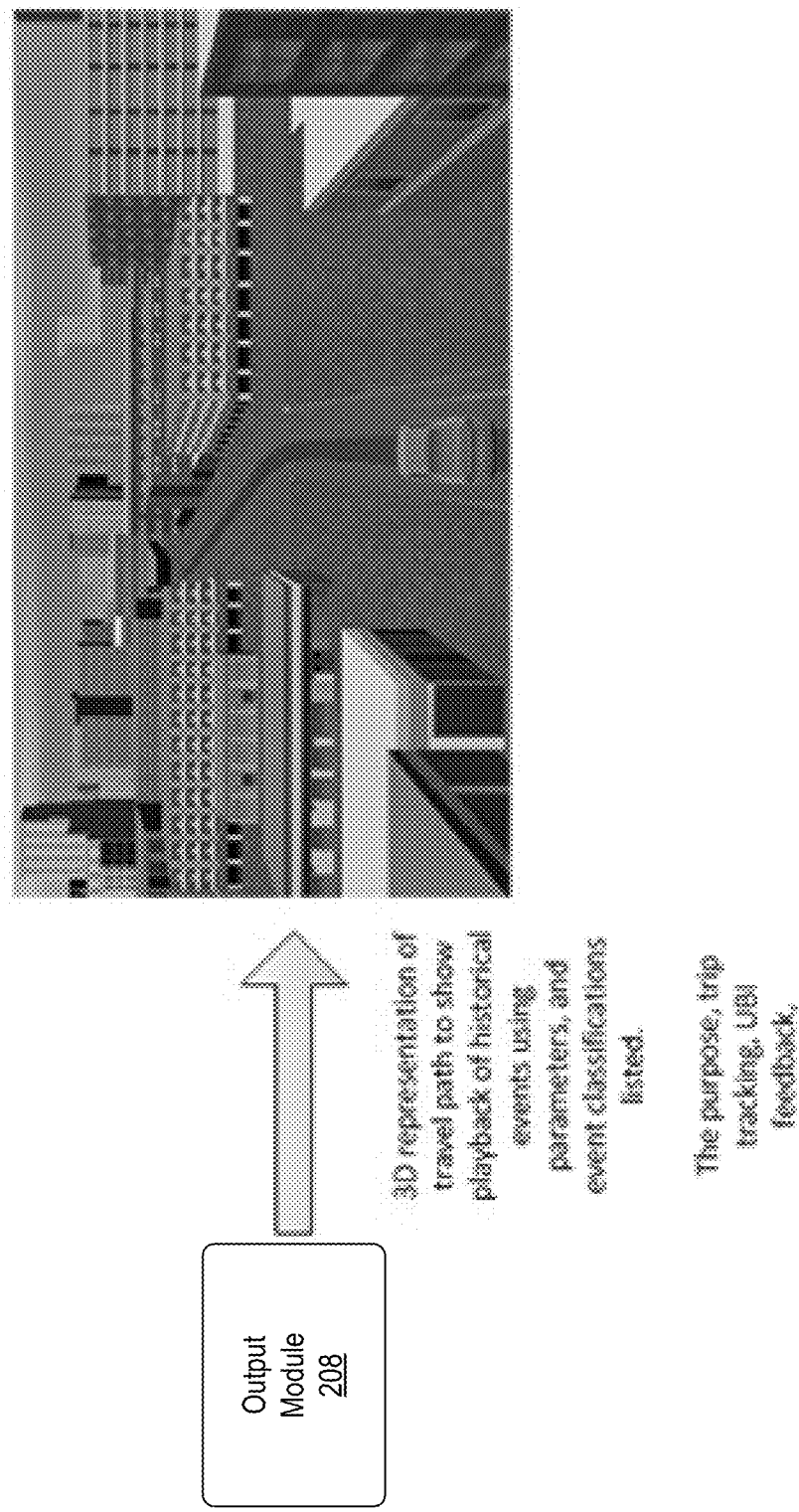
FIG. 5 depicts an exemplary video animation of a drive output to a display device, according to an exemplary embodiment of the invention.

Input module 202 may further gather user data 108 such as information about the user(s) (e.g., the driver(s) in this exemplary embodiment) and/or user preferences. Information about the user(s) may include one or more pictures of the user(s) or even a model of the user(s). User data 108 may also include user preferences such as where the "camera" should be located for the digital video animation, the speed of replay for the video animation, or whether only "events" should be rendered for the video animation. FIG. 5 shows one exemplary location of the "camera" for the video animation, but the view may also be from within one of the user's car (e.g., "dashcam" view), to the side of the car, or an overhead view, for example.

To shorten the amount of time that is required for generating an animated video, the generation module 204 may generate a number of animations in advance, including an animation of the vehicle and/or person. Further, user input may be gathered before a particular drive even takes place, in the form of user data 108, and this data may include the starting and stopping location of a drive the person is about to take. Upon receiving such user input, the input module 202 or generation module 204 may prepare one or more likely routes the user will take between the starting and stopping locations, which data may be termed "route data." For example, if a user specifies a starting location of Washington, D.C., and a stopping location of Baltimore, Md., generation module may prepare one route along the Capital Beltway (I-495) and along I-95, and may prepare another route along US-50 E/New York Ave along NE and the Baltimore Wash. Parkway (MD-295N). These routes may be prepared by combining location data (e.g., GPS coordinates) with mapping data to determine the user's likely route(s). Then additional animation may be added to the likely route(s) by adding satellite images, street view pictures, 2D maps, 3D maps, and/or pictures or structural models of buildings along the route(s), to yield "route data." In short, much of the mapping data 105, manufacturer data 106, and user data 108 may be gathered in advance of the actual drive by the user. By preparing a substantial portion of the video animation beforehand, relatively little processing will need to take place later, and such later processing would include processing and/or incorporation of actual driving data.

As explained above, various data (i.e., sensor data) may be gathered during the drive by the OBD device. Such data may be compared or added to the "route data" and the route data may be modified or supplemented accordingly. For example, if the driver takes a detour from I-95, then the driving data gathered during the detour may replace that portion of the route data that corresponds to the detour taken by the driver (e.g., a portion of I-95 that the driver departed from). The driving data may modify the route data by making the route data more precise. For example, even if the driver took one of the likely routes from beginning to end, the route data may be modified to include the precise location on the road on which the driver traveled, such as the particular street lanes along the route. Moreover, driving data may supplement the route data to make the video animation a more accurate depiction of the drive. For example, the driver's force of turns, accelerations, decelerations, braking, turning radius, speeds, signaling, headlights, wipers, etc., may be used to supplement or modify the route data to provide an accurate depiction of the avatar's (vehicle's) movement from the starting location to the ending location. Additionally, environmental data may supplement the route data to allow the driving environment in the video animation to more accurately depict the actual drive. For example, data regarding the time of the drive and weather during the drive will aid the generation module 204 in generating an environment around the avatar (vehicle), such as whether the streets were wet, dry, or icy, the amount of light provided by the sun or moon, whether it rained or snowed, or even the amount of clouds during the drive. Like the sensor data, environmental data 107 may be gathered over time and linked to particular locations and times of the drive.

FIG. 6 shows a portion of exemplary data that may be used by generation module 204 to generate a video animation. Sensor data 601 may be gathered over a period of time and labeled with timestamps, as depicted in FIG. 6. Sensor data in the exemplary embodiment of one or more vehicles may include location (e.g., latitude and longitude coordinates), heading (degrees), whether the window wipers are on/off, vehicle speed, vehicle status, whether the headlights are on/off, application of brakes, wheel slippage, skidding, sliding, rate of acceleration (measured in g's in the x, y, z directions, for example), pressure values (kPa), altitude, grade (rate of incline/decline), fuel consumption, rate of ascent or descent, force of turns, pivots, or other g-forces, etc. Each of these may be characterized as a parameter and may be organized according to the exemplary schema shown in FIG. 6, i.e., in a table organized by rows and columns. The "heading" may be considered a parameter, but is given its own column for explanatory purposes. The data gathered by the sensor(s) may be collected at different rates, as explained above. For example, acceleration data may be gathered at 50 Hz and location data may be gathered at 1-2 Hz, while data regarding whether the window wipers are turned on does not need to be gathered nearly as frequently.

Environmental data 602 may also be gathered by sensors on the OBD device in this exemplary environment. Alternatively, environmental data may come from third parties, as explained above. In either case, the environmental data also includes a timestamp, location, and various parameters, such as temperature, type and degree of precipitation, amount of light (measured in Kelvins, for example), as depicted in FIG. 6. The timestamps and locations of the environmental data 602 may be matched up with the timestamps and locations in sensor data 601 such that the data is correlated together. In the exemplary embodiment, the environmental data 602 in FIG. 6 may be gathered by the OBD device such that the locations and timestamps match up easily with the sensor data 601. However, the environmental data 602 may not be gathered nearly as frequently as sensor data 601, so the amount of environmental data 602 may be significantly less than the amount of sensor data 601. Accordingly, the relative timestamps will not likely be the same, but the timestamps (and the location stamps) may easily be matched up between the sensor data 601 and environmental data 602 based on their respective values.

Map data 603 and model data 604 may be considered "static" data in the sense that this data does not change nearly as frequently as sensor data 601 or even environmental data 602. Map data 603 may come from third party sources, as explained above. Images from various locations and headings at those locations may be used by the generation module 204 when generating a video animation. Map data 603 may include data from all over the world, but only a small subset of this data will be relevant for any particular video animation. Map data 603 may also have a location stamp and a heading associated with an image file, such as a .jpeg. Other image file types may be used. The locations and headings of map data 603 may be matched up with the location and headings of sensor data 601, such that a particular image file (e.g., JPG_1) may be correlated with data having a particular timestamp in sensor data 601. In this manner, a collection of map/satellite images may be correlated to sensor data 601, and used by generation module 204 when generating a video replay of the drive, according to the exemplary embodiment.

Model data 604 may come from vehicle manufacturers, as explained above. Model data 604 may comprise images of various vehicles, including images of the vehicle at various angles or perspectives. Model data 604 in FIG. 6 gives an example of various images (JPG_A-JPG_E) associated with a Porsche 911 at various angles. Of course it must be appreciated that images in other file types, at other angles or perspectives, and of other vehicle makes and models may be used in the present invention. The type of vehicle used may be input by a user and recorded as a user setting.

By combining mapping data 105, manufacturer data 106, environmental data 107, and user data 108, generation module 204 may generate a video replay of the user's drive, and provide such video replay to output module 208, which may in turn output the video replay to a display device, such as a mobile device 120, network client 130, or vehicle display 140, for example.

The methods and systems of the present invention may also be applied in various sporting applications, including racing, wakeboarding, skateboarding, bicycling, surfing, skiing, snowboarding, ATVing, motorcycling, boating, using a personal watercraft, tubing water skiing, zip lining, skating, rollerblading, kayaking, road biking, mountain biking, or sail boating. For example, sensors may be attached to a snowboarder or a mountain biker about to make a run down a mountain. The bicycle 118 shown in FIG. 1 may be representative of any of the above-recited sporting applications. Movement of the individual may be measured by various sensors connected to the user's body, including a gyroscope and an accelerometer, and these sensors may be used to sense location, speed, acceleration, jumps, altitude, heading, right leans, left leans, falls, etc., during the run. Similar to the exemplary vehicle embodiment, sensor data may be combined with mapping data 105, manufacturer data 106, environmental data 107, and user data 108, to allow generation module 204 to generate an accurate video replay of the user's run. For example, mapping data 105 may come from a third party source, such as opencyclemap.org, which depicts the location of various biking trails throughout the world. Manufacturer data 106 may come from bicycle manufacturers, for example. Environmental data 107 and user data 108 may come from similar sources as explained above with regard to the exemplary vehicle embodiment. Mapping data 105 and environmental data 107 may be used to generate a virtual route, and sensor data 117 may provide data on the orientation of the user's body, force on the user's body, and location of the user during the run. Such data may be combined to generate and present to the user a 2D or 3D mapped virtual world with an avatar, representing the user, traveling through the virtual world, which may comprise an aggregation of 2D or 3D images of locations traversed by the user.

In the exemplary sporting application, a combination of one or more gyroscopes and accelerometers may be used to gather data on the force and orientation of the user. A gyroscope may be used to sense the orientation and change in orientation of the user, and an accelerometer may be used to determine jumps, falls, or other gravitational forces on the body. A GPS sensor may be used to sense location and forward, backward, or sideways travel of the user. Using the gyroscope and accelerometer, the degree and amount of leans or forces may be measured, and thereafter depicted in the avatar in the video animation. At a minimum, an avatar may be considered to have three axes about a waist of the avatar. Data from the gyroscope and accelerometer may be used to adjust the amount the avatar leans to the left, right, forward, or backwards, and the acceleration associated with these different events, about the at least three axes of the avatar. Additional sensors may be affixed to different locations of the user's body in order to get a more accurate depiction of movement during the run.

As explained above, data may be interpreted by the input module 202 and/or the generation module 204 to classify events. With regard to the exemplary vehicle embodiment, various vehicular events may be classified, such as a hard or soft stop, as depicted in FIG. 4. Either the GPS data or accelerometer data gathered by the OBD device may be used to determine whether the vehicle stopped. However, classifying a stop as either a "hard" stop or a "soft" stop may be done by comparing the accelerometer data (or rate of change of location data) to a threshold value. For example, a stop where the vehicle's velocity decreases by more than 20 ft/sec, on average, may be classified as a "hard stop" or a "sudden stop." If the driver slows to a stop by a rate slower than 20 ft/sec, then the stop may be classified as a "soft stop" or not classified at all. Similarly, turns may be classified as either "hard turns" or "soft turns" or not classified at all. A gyroscope may be most effective in classifying turns, but a combination of data may be used. The rate of change of a vehicle's heading may be used to classify whether turns are "hard" or "soft." Additionally, gyroscope data may be combined with velocity data or accelerometer data in classifying various events. A rapid change in a vehicle's heading may not be considered a "hard turn" if the vehicle's velocity is very low. However, as the vehicle's velocity increases, a smaller rate of change in vehicle heading may still be considered a "hard turn." Accordingly, a plurality of values may be used to classify turns as either "hard" or "soft." Alternatively, accelerometer data alone may be sufficient to classify an event as either "hard" or "soft." For example, centrifugal forces or other g-forces measured by the accelerometer may be compared to a predetermined threshold value. A turn that produces a centrifugal force in excess of 0.5 g, for example, may be considered a "hard" turn, where "g" is a measure of g-force.

Further, portions of the drive may be classified as "speeding" under various circumstances. Mapping data 105 may have speed limits associated with the roads in the mapping data 105. Accordingly, "speeding" events may be classified by comparing the vehicle's speed to the speed limit data from mapping data 105. Additionally, even if a driver is not speeding, there may be a speed bump in the road that the driver does not slow down for. Data from the accelerometer in the OBD device may be used to classify a "speeding" event over a speed bump by comparing acceleration data, or g-force data, to a threshold value.

Other "events" may be classified, such as a "rapid acceleration" event, turning without signaling, changing lanes without signaling, not turning headlights on when the wipers are on, "left-foot" braking (i.e., repeated use of the brake pedal without actually slowing down), or failure to stop at a stop sign. An event may be classified as "rapid acceleration" by comparing data gathered by the accelerometer to a threshold value. For example, linear accelerations having a g-force greater than 0.3, for example, may be considered a "rapid acceleration." Classifying turns as "turning without signaling," or lane changes as "changing lanes without signaling" may be performed using location data from a GPS sensor, a gyroscope, and data regarding when vehicle turn signals are activated from the OBD device. Classifying certain portions of the drive as "not turning on headlights when the wipers are on" may be easily performed using data gathered from the OBD device. Also, classifying a combination of braking as "left-foot braking" may be performed using braking data and speed data gathered from the OBD device. Classifying a failure to stop may be performed using velocity data, location data, and corresponding mapping data, which may depict locations of stop signs.

Moreover, yet other "events" may be classified, such as "late driving" or "rush hour driving," which are not necessarily indicative of poor driving habits, but may be indicative of drives with increased risk. "Late driving" may be classified by comparing the time of the drive, as recorded by the OBD device, for example, to a predetermined time, such as 12:00 AM to 4:00 AM. Drives that occur within this exemplary time period may be classified as "late driving." "Rush hour driving" may be classified by comparing the driving location to traffic data within mapping data 105, for example. Alternatively, if traffic data is not available, "rush hour driving" may be classified by analyzing the driving location, time of the drive, and the driving speed from the sensor data 117, and perhaps speed limit data within mapping data 105. If the drive took place on a freeway or other road during a typical "rush hour" time period (e.g. 7:30 AM-8:30 AM and 5:00 PM-6:00 PM), but the average speed for a duration of the drive on the freeway/road was substantially less than the actual speed limit on the freeway/road, or less than a typical speed limit on a freeway/road (e.g. 65 mph or 45 mph, respectively), then that portion of the drive may be classified as "rush hour driving."

Each of these classifications may be useful for coaching, learning, insurance, or other purposes. As explained above, a user may elect to view only classified events in the video animation. Accordingly, generation module 204 may render only the portion of the data comprising classified events, or may render the entirety of the data but only output the portion containing classified events. This will allow the user to view the video animation in a short amount of time, and enable the user or others to focus on atypical events during the drive or events that exceeded a predetermined threshold value during the drive.

In a driver's education setting, a teacher, driving coach, or student driver may be interested in viewing driving events that may be improved upon. For example, a teacher may want to show the student driver the times where the student driver made a "rolling stop" instead of a full stop at a stop sign. Alternatively, the teacher may want to show the student driver any of the exemplary classified events described above, such as speeding, hard turns, hard stops, rapid accelerations, turning without signaling, changing lanes without signaling, not turning headlights on when the wipers were on, or "left-foot" braking, for example. A driver may be shown all of the classified events pertaining to poor driving habits and may be presented with feedback on how to drive better and targeted areas to improve upon based upon the classified events.

The disclosed systems and methods may also be useful for insurance purposes, such as usage-based insurance (UBI). A driver may be interested in UBI because good driving habits may be rewarded with lower insurance costs. An insurance company may be interested in viewing an animated video of a user's drive, or classified events from one or more drives, for the purpose of determining or adjusting insurance rates. Insurance companies recognize that aggressive or careless behavior are indicative of increased risk. An animated video or classified events from one or more drives may highlight such aggressive or careless behavior, including rapid acceleration, hard or sudden stops, speeding, or hard/reckless cornering. Moreover, an insurance company may look at other classified events such as "late driving" in which the drive takes place late at night, such as after midnight. Alternatively, an insurance company may be interested in the amount of driving that takes place in high traffic situations, which periods may be classified as "rush hour driving," for example. Such classifications may be factored in by the insurance company when underwriting insurance or processing claims. As should be apparent from this disclosure, the systems and methods disclosed herein may be used by the insurance company and the driver during the underwriting stage or throughout the duration of insurance coverage.

The disclosed systems and methods may also be useful for purposes of accident reconstruction or vehicle tracking Data may be continually gathered by OBD device(s) on the vehicle(s) whenever the vehicle is running, and such data may be input into input module 202 and stored in storage module 206. Optionally, input module 202 may also gather external data such as mapping data and environmental data that may be associated with the sensor data, e.g., data gathered by the OBD device. User settings may specify that the data should be left undisturbed until an accident happens or until requested by the user, such as in a stolen vehicle incident. Once an accident occurs, the gathered data may be used by generation module 204 for the purpose of reconstructing the accident in the form of an animated video replay. As such, the system may function as a "black box" by storing the data for later use, such as for liability, forensic, or insurance purposes. Accordingly, an animated video may be useful by law enforcement investigating an accident or report of a stolen vehicle, accident victims litigating over an accident, or insurance companies processing claims associated with an accident. In the case of data gathered from multiple OBD devices on multiple vehicles, the generated video animation may include vehicles operating in the vicinity of each other. Sensor data 117 from multiple OBD devices may be retrieved by the input module 202. In an exemplary embodiment, if two vehicles each have an OBD device that is recording data, and these two vehicles happen to get into an accident, input module 202 may gather data from each OBD device, associate the sensor data 117 with other data, such as mapping data 105, manufacturer data 106, environmental data 107, and/or user data 108, and used by generation module 204 to reconstruct the accident involving the two vehicles in the form of an animated video replay. For example, if a first driver stops at a stop sign and then proceeds, and a second driver coming to the intersection from a different direction fails to stop and collides with the first driver in the intersection, the avatar replay may show an avatar of the second driver approaching, failing to stop, and then colliding with the first user's vehicle if sensor data is also gathered from the second driver, or an OBD device on the second vehicle. Of course, data from one, two, or more OBD devices may be used when generating an animated video replay, and the replay may involve a race by two or more drivers. These are just a few of the many areas that the present invention may be used in. Generating an animated video replay of a sporting "run" may also use sensor data from multiple users, as would be appreciated by one of ordinary skill in the art reading the present disclosure.

As explained above, generation module 204 may generate a video replay of the user's drive, and provide such video replay to output module 208, which may in turn output the video replay to a display device, such as a mobile device 120, network client 130, or vehicle display 140, for example. The mobile device 120, network client 130, or vehicle display 140 may run an application configured for displaying animated replays of various drives. For explanatory purposes, reference will be made to a mobile device 120, such as a smartphone or tablet computer, running an application for displaying animated replays.

Application server 103 may provide an application to mobile device 120. Via the application installed on mobile device 120, or using another computing device, the user may establish various user settings. The application may be a third-party application, such as a maps application and distributed to mobile device 120 using application server 103. Also, the application may be a social media add-on such that it operates in conjunction with a social media application, but may be maintained by an entity other than the social media entity.

User settings may be established and user data 108 may be input by the user within the application, or using an associated website on the Internet, and may be stored on mobile device 120 or on application server 103. The user settings and user data 108 may be input into input module 202 and used by generation module 204 when generating the animated video. The animated video may then be output to output module 208 and distributed to mobile device 120 for viewing by the user. An exemplary view of the animated video replay is shown in FIG. 5, and such video may be viewed on any video displaying device, such as mobile device 120, network client 130, or vehicle display 140, for example. Various "drives" may be saved within mobile device 120, or in storage module 206, for example. Animated videos of other user's drives may be viewed by other people for various purposes, including teaching, insurance, or law enforcement, as explained above.

Figure 7:
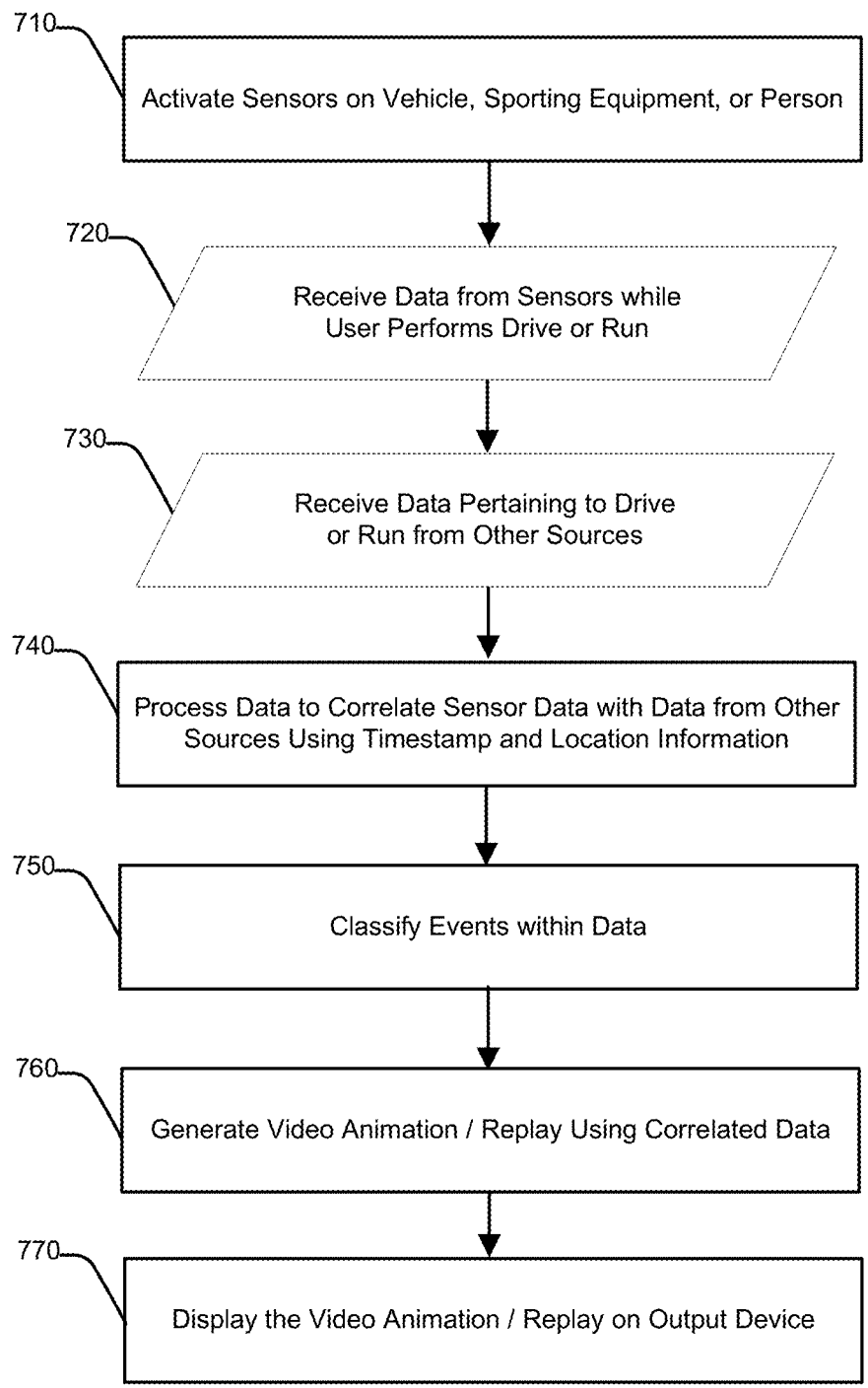
FIG. 7 depicts an illustrative flowchart of a method for generating a video replay, according to an exemplary embodiment.

Referring to FIG. 7, an illustrative flowchart of a method for generating a video replay is shown. This exemplary method 700 is provided by way of example, as there are a variety of ways to carry out methods according to the present disclosure. The method 700 shown in FIG. 7 can be executed or otherwise performed by one or a combination of various systems and modules. The method 700 described below may be carried out by system 100 shown in FIG. 1 and computing device 200 shown in FIG. 2, by way of example, and various elements of the system 100 and computing device 200 are referenced in explaining the example method of FIG. 7. Each block shown in FIG. 7 represents one or more processes, decisions, methods or subroutines carried out in exemplary method 700, and these processes, decisions, methods or subroutines are not necessarily carried out in the specific order outlined in FIG. 7, nor are each of them required. Referring to FIG. 7, exemplary method 700 may begin at block 710.

At 710, sensors may be affixed to and/or activated on the monitored apparatus, such as a vehicle, sporting equipment, or on a person (such as a helmet on a person). When the sensors are activated they are ready to gather data. Exemplary sensors include an OBD device, accelerometer, gyroscope, barometer, altimeter, etc., as explained above. The user may begin or continue his/her drive or run once the sensors are activated.

At 720, input module 202 of computing device 200 may receive or retrieve data from the sensors 117, directly or via network 102, while the user performs or concludes the drive/run. The data from sensors 117 may be fed directly to generation module 204 or stored in storage module 206.

At 730, input module 202 may receive or retrieve data pertaining to the drive or run from other sources, via network 102. Other sources may include third party mapping sources, such as Google Maps®, OpenStreetMap, OpenCycleMap, NavTeq®, Garmin®, Microsoft®, or Yahoo®, for example; manufacturing sources such as vehicle manufacturers, architects, or model aggregators such as TurboSquid®, for example; sources of environmental data such as The National Climatic Data Center or OpenWeatherMap, for example; or from a user in the form of data provided by or about a user, user preferences, or other information about a user's vehicle or sporting apparatus. This data may pertain to the drive or run, such as the location and/or of the drive or run. For example, the mapping data 105 may comprise 2D or 3D images or maps of the location through which the drive/run takes place. The manufacturer data 106 may comprise images of the vehicle or apparatus that the user is using. The environmental data 107 may include information on the weather at the time and the location through which the user is traveling. And user data 108 may include a starting and/or stopping location for the drive or run. Similar to above, this data may be communicated directly from input module 202 to generation module 204 or stored in storage module 206.

At 740, generation module 204 may process the data by correlating data from the sensors 117 with data from the other sources. As explained above with regard to FIG. 6, this data may be correlated by using the timestamp and location information within the data. In other words, data having the same or a similar timestamp and location stamp may be correlated or linked together. For example, at a particular instance during the drive, the user may be turning a corner at a particular location. Generation module 204 may generate an avatar that is turning, based on the gathered sensor data 117, and also depict the location on a 2D or 3D map, based on the gathered mapping data 105, along with buildings nearby to the location of the turn, also based on the gathered mapping data 105. Generation module may also adjust the environment in the video replay based on the environmental data gathered at 730.

At 750, various "events" within the data may be classified by comparing the data to various threshold or default values. For example, a vehicle stop may be classified as either a "hard" stop or a "soft" stop by comparing the accelerometer data (or rate of change of location data) to a threshold value. Alternatively, an event may be classified by comparing the sensor data to a default value. For example, if the environmental data states that it was raining at the driver's location, and/or the driver's wipers are on, but the driver's headlights are not on, that portion of the drive may be classified as a driving hazard event. Once the various events within the data have been classified, the corresponding data may be tagged with that classification, and may be stored in storage module 206 (or the data in storage module 206 may be updated accordingly). For example, additional metadata may be added to the data indicating the classification for that particular data. Not all data needs to be classified as an "event," so not all data will have such "event metadata." This metadata, however, may be useful when viewing the video replay in that it may function as a chapter marker or "event marker" to allow the viewer to skip from one event to another. Additionally, various events may be associated with text that may be displayed on the display device when viewing the video replay. For example, if a portion of the drive is classified as a "speeding event," then text may be generated by the generation module 204 or output module 208 and may appear on the display device during that portion of the video, stating, for example, "Speeding! Speed Limit: 55 mph; Your Speed: 70 mph." Other text may be generated and displayed on the display device based on the type of classification for each "event." For hard turns, hard stops, or fast accelerations, for example, various exemplary text associated with such events may include, "Took left turn too fast. Try taking the turn slower next time." "Accelerated too fast from start. Try accelerating slower next time." "Stopped too hard from a high rate of speed. Try slowing down at a more gradual rate next time." "Your drive was too fast when approaching the curve. For safety, try taking the turn at a slower speed next time." The text displayed on the display device when the event occurs in the video replay can be instructive, or can simply name or describe the event, for example. The text may be a representation of textual data, and the textual data may be associated with the event metadata upon classification of the various events. The generation module 204 may use the event metadata and textual data when generating the animated video replay.

At 760, generation module 760 may generate the video animation or replay using the correlated data. As explained above, generation module may generate an avatar based on vehicle manufacturer data or may use a default vehicle model. The motion of this avatar is based on data from the sensors 117, and the surrounding environment is based on images from mapping data sources and environmental data sources. Models or images of the avatar may be superimposed on models or images of the surrounding environment, and the depiction of the surrounding environment/roads may be moved relative to the avatar to give the appearance of the vehicle avatar moving through the environment or traveling down the roads. During such motion, the orientation of the avatar itself may be continually updated based on data from sensors 117 to depict the user's actual drive through the depicted surrounding environment or roads. The generated result is an animated or motion picture video, which may be stored in storage module 206 or directly sent to output module 208.

At 770, the generated video may be output to a display device by output module 208, as shown in FIG. 5. The display device may be mobile device 120, network client 130, or vehicle display 140, for example.

In summary, embodiments may provide a system and method for generating and displaying a video replay of a drive or run, on a display device for various purposes including entertainment, teaching, insurance, or law enforcement, for example.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed is:

1. A method comprising:
receiving, by a device, sensor data generated during a drive, from one or more sensors onboard a vehicle;
receiving, by the device and in advance of the drive, mapping data corresponding to locations to be traveled during the drive by the vehicle,
the mapping data, comprising 2D or 3D images and road information, having been generated independent of the drive by the vehicle;
processing the sensor data and the mapping data, by the device, to correlate the sensor data and the mapping data using location information in the sensor data and in the mapping data;
generating, by the device, a video animation of the drive using the sensor data and mapping data,
at least a portion of the video animation being generated in advance of the drive based on the 2D or 3D images and road information received in advance of the drive,
modifying, by the device, the at least the portion of the video animation, generated in advance of the drive, to include a precise location on a road in which the vehicle traveled during the drive based on the sensor data generated during the drive by the one or more sensors onboard the vehicle; and
outputting, by the device, the video animation of the drive, including at least a modified portion of the video animation, to a display device.

2. The method of claim 1, where the one or more sensors comprise an OnBoard Diagnostic (OBD) device,
the OBD device comprising a location sensor, an accelerometer, and a gyroscope.

3. The method of claim 1, further comprising:
classifying events by comparing the sensor data to predetermined threshold values or default values.

4. The method of claim 3, where the events include at least two of: a hard stop, a hard turn, speeding, failure to stop, or failure to signal.

5. The method of claim 3, further comprising:
using the events for underwriting in usage-based insurance (UBI) or to instruct a driver to improve driving performance.

6. The method of claim 3, further comprising:
outputting text identifying the events.

7. The method of claim 1, wherein the display device is a smartphone, tablet computer, or a vehicle display.

8. The method of claim 1, further comprising:
receiving environmental data; and
processing the environmental data to correlate the environmental data and the sensor data using timestamp information and location information in the sensor data and in the environmental data.

9. The method of claim 1, further comprising:
receiving manufacturer data and weather data,
the manufacturer data comprising model data of the vehicle, and
the weather data comprising climate data corresponding to a time that the vehicle performed the drive,
where generating the video animation comprises:
generating a visual depiction of a model of the vehicle and weather conditions encountered by the vehicle during the drive using the manufacturer data and the weather data.

10. A device comprising:
one or more processors to:
receive sensor data, generated during a drive, from one or more sensors onboard a vehicle;
receive, in advance of the drive, mapping data corresponding to locations to be traveled during the drive by the vehicle,
the mapping data, comprising 2D or 3D images and road information, having been generated independent of the drive by the vehicle;
process the sensor data and the mapping data to correlate the sensor data and the mapping data using location information in the sensor data and in the mapping data;
generate a video animation of the drive using the sensor data and mapping data,
at least a portion of the video animation being generated in advance of the drive based on the 2D or 3D images and road information received in advance of the drive,
modify the at least the portion of the video animation, generated in advance of the drive, to include a precise location on a road in which the vehicle traveled during the drive based on the sensor data generated during the drive by the one or more sensors onboard the vehicle; and
output the video animation of the drive, including at least a modified portion of the video animation, to a display device.

11. The device of claim 10, where the one or more sensors comprise an OnBoard Diagnostic (OBD) device,
the OBD device comprising a location sensor, an accelerometer, and a gyroscope.

12. The device of claim 10, where the one or more processors are further to:
classify events by comparing the sensor data to predetermined threshold values or default values.

13. The device of claim 12, where the events include at least two of: a hard stop, a hard turn, speeding, failure to stop, or failure to signal.

14. The device of claim 12, where the events are used for underwriting in usage-based insurance (UBI) or to instruct a driver to improve driving performance.

15. A non-transitory computer-readable medium storing instructions, the instructions comprising:
one or more instructions which, when executed by a processor, cause the processor to:
receive sensor data, sensed during a drive, from one or more sensors onboard a vehicle;
receive, in advance of the drive, mapping data corresponding to locations to be traveled during the drive by the vehicle,
the mapping data, comprising 2D or 3D images and road information, having been generated independent of the drive by the vehicle;
process the sensor data and the mapping data to correlate the sensor data and the mapping data using location information in the sensor data and in the mapping data;
generate a video animation of the drive using the sensor data and mapping data,
at least a portion of the video animation being generated in advance of the drive based on the 2D or 3D images and road information received in advance of the drive,
modify the at least the portion of the video animation, generated in advance of the drive, to include a precise location on a road in which the vehicle traveled during the drive based on the sensor data sensed during the drive by the one or more sensors onboard the vehicle; and
output the video animation of the drive, including at least a modified portion of the video animation, to a display device.

16. The method of claim 1, further comprising:
receiving user information indicating a starting location for the drive and an ending location for the drive;
determining at least one route for the drive based on the user information; and
where receiving the mapping data in advance of the drive comprises:
receiving the mapping data in advance of the drive based on the at least one route.

17. The method of claim 1, where outputting the video animation includes outputting the video animation as a replay of the drive.

18. The method of claim 1, where modifying the at least the portion of the video animation includes:
modifying the at least the portion of the video animation generated in advance of the drive to include a lane of a street in which the vehicle traveled during the drive.

19. The method of claim 1, where modifying the at least the portion of the video animation includes:
modifying the at least the portion of the video animation generated in advance of the drive based on at least one of:
a force of a turn of the vehicle during the drive, or
a turning radius of the vehicle during the drive.

20. The method of claim 1, where modifying the at least the portion of the video animation includes:
modifying a depiction of an avatar for the vehicle to reflect at least one of a force of a turn of the vehicle during the drive or a turning radius of the vehicle during the drive.

* * * * *